United States Patent
Smee et al.

(10) Patent No.: US 7,027,503 B2
(45) Date of Patent: Apr. 11, 2006

(54) RECEIVER WITH A DECISION FEEDBACK EQUALIZER AND A LINEAR EQUALIZER

(75) Inventors: John Smee, San Diego, CA (US); Ivan Jesus Fernandez-Corbaton, San Diego, CA (US); Srikant Jayaraman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 384 days.

(21) Appl. No.: 10/162,976

(22) Filed: Jun. 4, 2002

(65) Prior Publication Data

US 2003/0223489 A1 Dec. 4, 2003

(51) Int. Cl.
  *H03H 7/30* (2006.01)
  *H03H 7/40* (2006.01)
  *H03K 5/159* (2006.01)

(52) U.S. Cl. ............... 375/233; 375/223; 375/229; 375/232

(58) Field of Classification Search ......... 375/233, 375/229, 232, 223, 230
See application file for complete search history.

(56) References Cited

U.S. PATENT DOCUMENTS

| | | | | |
|---|---|---|---|---|
| 5,052,000 A | * | 9/1991 | Wang et al. ............. | 714/758 |
| 5,513,214 A | * | 4/1996 | Gozzo ..................... | 375/232 |
| 5,541,956 A | | 7/1996 | Ueda | |
| 5,644,597 A | * | 7/1997 | Ueda ...................... | 375/232 |
| 5,659,576 A | * | 8/1997 | Critchlow et al. ........ | 375/219 |
| 5,757,855 A | * | 5/1998 | Strolle et al. ............ | 375/262 |
| 6,052,412 A | * | 4/2000 | Ruether et al. ........... | 375/231 |
| 6,069,917 A | * | 5/2000 | Werner et al. ............ | 375/233 |
| 6,118,813 A | * | 9/2000 | Lai ......................... | 375/231 |
| 6,130,909 A | * | 10/2000 | Anvari et al. ............ | 375/232 |
| 6,219,561 B1 | * | 4/2001 | Raleigh ................... | 455/561 |
| 6,240,133 B1 | * | 5/2001 | Sommer et al. .......... | 375/232 |
| 6,381,271 B1 | * | 4/2002 | Javerbring ............... | 375/233 |
| 6,570,910 B1 | * | 5/2003 | Bottomley et al. ....... | 375/148 |
| 6,636,568 B1 | * | 10/2003 | Kadous ................... | 375/225 |

OTHER PUBLICATIONS

LMS–type self–adaptive algorithms for predictive decision feedback equalizer□□Bo Seok Seo; Jiho Jang; Seung Jun Lee; Choong Woong Lee; Global Telecommunications Conference, 1997. GLOBECOM '97., IEEE, vol.: 1, Nov. 3–8, 1997 pp.: 67–71 vol. 1*

* cited by examiner

*Primary Examiner*—Stephen Chin
*Assistant Examiner*—Harry Vartanian
(74) *Attorney, Agent, or Firm*—Philip Wadsworth; Sandra L. Godsey; Kent D. Baker

(57) ABSTRACT

Techniques for selecting either a DFE or an LE for use to equalize a received signal, and for quickly and efficiently determining the coefficients for the selected equalizer. In an embodiment, a method is provided whereby the DFE is initially adapted based on the received signal and a particular adaptive algorithm (e.g., the LMS algorithm) for an initial time period. A quality metric is then determined for an output of the DFE. The DFE is selected for use if the quality metric is better than a threshold value, and the LE is selected otherwise. If the LE is selected, then the initial values for the coefficients of the LE may be derived based on the coefficients of a feed-forward filter and a feedback filter for the DFE, and the LE coefficients may further be adapted for an additional time period prior to its use to equalize the received signal.

23 Claims, 7 Drawing Sheets

RECEIVER WITH A DECISION FEEDBACK EQUALIZER AND A LINEAR EQUALIZER

BACKGROUND

1. Field

The present invention relates generally to data communication, and more particularly to techniques for using a decision feedback equalizer and a linear equalizer in a manner to provide improved performance at a receiver.

2. Background

Wireless communication systems are widely deployed to provide various types of communication such as voice, packet data, and so on. These systems may be multiple-access systems capable of supporting communication with multiple users and may be based on Code Division Multiple Access (CDMA), Time Division Multiple Access (TDMA), Frequency Division Multiple Access (FDMA), or some other multiple access techniques. These systems may also be wireless Local Area Network (LAN) communication systems, such as those that conform to the IEEE standard 802.11b.

For a wireless communication system, data is processed at a transmitter and sent to a receiver via a wireless communication channel. This channel may experience frequency selective fading, which is characterized by different amounts of signal attenuation across the system bandwidth. The frequency selective fading causes Inter-Symbol Interference (ISI), which is a phenomenon whereby each symbol in a received signal acts as distortion to subsequent symbols in the received signal. The ISI distortion degrades performance by impacting the ability to correctly detect the received symbols.

An equalizer may be used to mitigate the deleterious effects of ISI. A Linear Equalizer (LE) and a Decision Feedback Equalizer (DFE) are two equalizer structures that may be used to equalize a received signal. The DFE uses a feedback filter to derive an estimate of the ISI distortion based on prior detected symbols. The DFE can effectively remove the ISI distortion if the detected symbols are reliable. Otherwise, errors in the detected symbols propagate to the distortion estimate and degrade performance. The LE performs equalization without the use of a feedback filter. In general, the DFE and LE are better suited for use under different operating conditions.

There is therefore a need in the art for techniques to select either the DFE or LE for use to equalize a received signal, and to efficiently adapt the selected equalizer.

SUMMARY

Techniques are provided herein for determining a quality metric for the output of an equalizer, selecting either a DFE or an LE for use depending on the quality metric, and quickly and efficiently determining the filter coefficients for the selected equalizer. These techniques may be used to advantageously select the DFE for equalizing a received signal when the quality metric is sufficiently high and to select the LE when the quality metric is low.

In an embodiment, a method is provided for equalizing a received signal in a wireless communication system. In accordance with the method, a DFE is initially adapted based on the received signal and a particular adaptive algorithm (e.g., an LMS algorithm) for an initial time period. A quality metric is then determined for the output of the DFE (e.g., after the initial time period). The quality metric may relate to (1) a Mean Square Error (MSE) between the equalized symbols from the DFE and expected symbols (e.g., pilot symbols), (2) a Signal-to-Interference-and-Noise Ratio (SINR) of the DFE output, (3) an error rate of the detected symbols provided by a slicer to the DFE, or some other parameter. The DFE is then selected for use if the quality metric exceeds a threshold value, and the LE is selected otherwise. If the LE is selected for use, then the initial values for the coefficients of the LE may be derived based on the coefficients of a feed-forward filter and a feedback filter for the DFE, and the LE coefficients may further be adapted for an additional time period prior to using the LE to equalize the received signal.

In another embodiment, an adaptive equalizer suitable for use in a wireless communication system is provided. The adaptive equalizer comprises a filter unit and an adaptation unit. The filter unit is configurable to implement either a DFE or an LE at any given moment, with either the DFE or LE being selected for use depending on a quality metric determined for the DFE output. The adaptation unit (1) determines the quality metric for the DFE output, (2) derives the coefficients for the DFE or the LE depending on which one has been selected for use, and (3) if the LE is selected, derives the initial values for the LE coefficients based on the feed-forward and feedback filter coefficients, and further adapts the LE coefficients for an additional time period prior to it being used to equalized the received signal.

Various aspects and embodiments of the invention are described in further detail below. The invention further provides methods, program codes, digital signal processors, integrated circuits, receiver units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
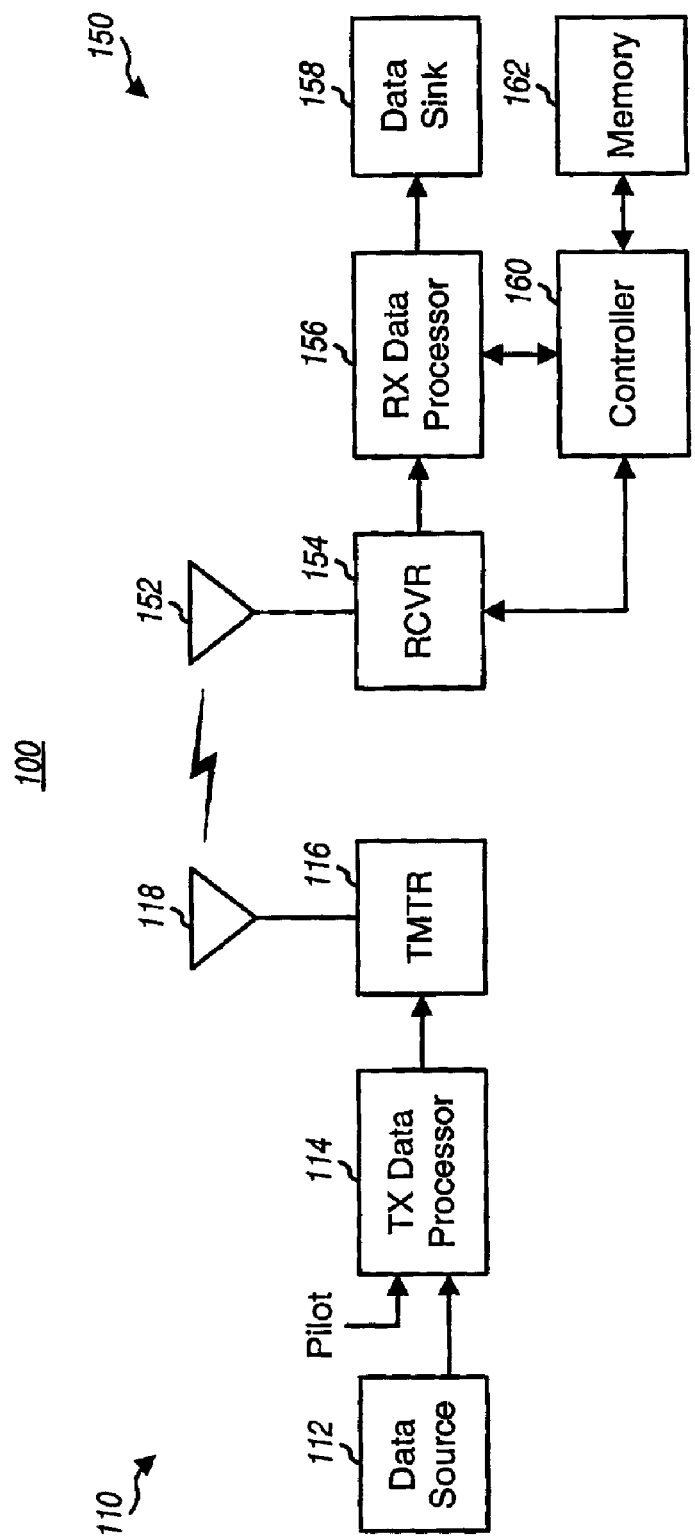
FIG. 1 is a block diagram of a transmitter system and a receiver system in a wireless communication system.

FIG. 1 is a block diagram of a transmitter system 110 and a receiver system 150 in a wireless communication system 100. At transmitter system 110, traffic data is sent (typically in packets that may be of variable lengths) from a data source 112 to a Transmit (TX) data processor 114. TX data processor 114 then formats and codes the traffic data to provide coded data.

Pilot data may be multiplexed with the traffic data using, for example, Time Division Multiplexing (TDM) or Code Division Multiplexing (CDM). The pilot data is typically a known data pattern that is processed in a known manner (if at all), and may be used by the receiver system to estimate the channel response. The multiplexed pilot and coded data is then modulated (i.e., symbol mapped) based on one or more modulation schemes (e.g., BPSK, QSPK, M-PSK, or M-QAM) to provide modulation symbols (i.e., modulated data).

A Transmitter (TMTR) unit 116 then converts the modulated data into one or more analog signals and further amplifies, filters, quadrature modulates, and upconverts the analog signals to generate a modulated signal. The modulated signal is then transmitted via an antenna 118 and over a wireless communication link to one or more receiver systems.

At receiver system 150, the transmitted modulated signal is received by an antenna 152 and provided to a Receiver (RCVR) unit 154. Within receiver unit 154, the received signal is conditioned (e.g., amplified, filtered, frequency downconverted, and quadrature downconverted) and the conditioned signal is further digitized to provide ADC samples. The Analog-to-Digital Converter (ADC) samples may further be digitally pre-processed within receiver 154 to provide data samples.

A Receive (RX) data processor 156 then receives and processes the data samples to provide decoded data, which is an estimate of the transmitted data. The processing by RX data processor 156 may include, for example, equalization, demodulation, deinterleaving, and decoding. The processing at RX data processor 156 is performed in a manner that is complementary to the processing performed at TX data processor 114. The decoded data is then provided to a data sink 158.

A controller 160 directs the operation at the receiver system. A memory unit 162 provides storage for program codes and data used by controller 160 and possibly other units within the receiver system.

The signal processing described above supports transmissions of various types of traffic data (e.g., voice, video, packet data, and so on) in one direction from the transmitter system to the receiver system. A bi-directional communication system supports two-way data transmission. The processing shown in FIG. 1 can represent the forward link (i.e., downlink) processing in a CDMA system, in which case, transmitter system 110 can represent a base station and receiver system 154 can represent a terminal. The signal processing for the reverse link (i.e., uplink) is not shown in FIG. 1 for simplicity.

Figure 2:
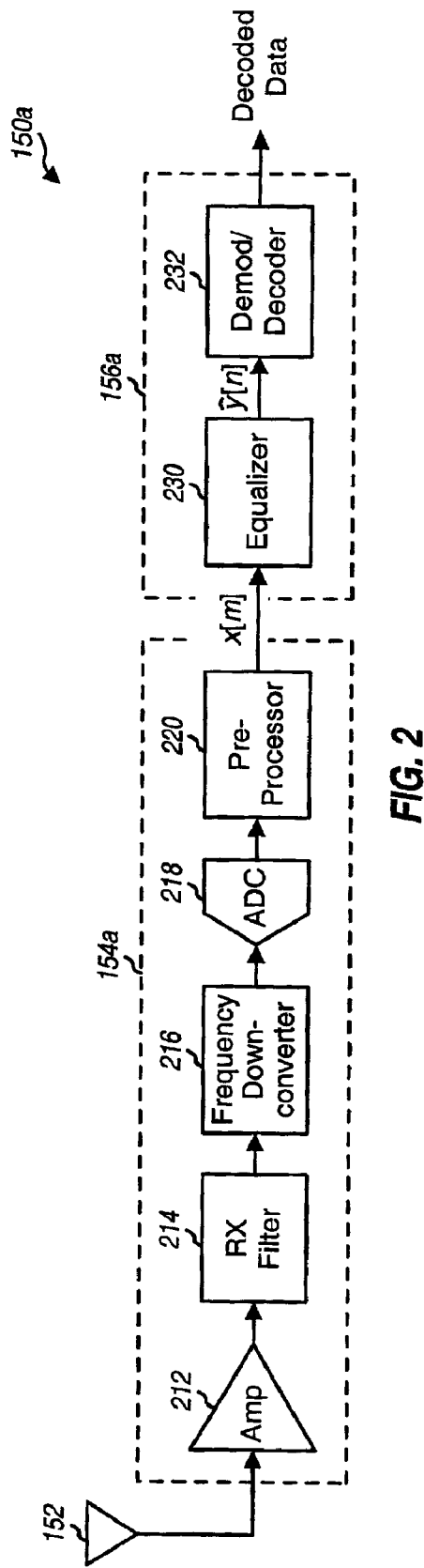
FIG. 2 is a block diagram of an embodiment of the receiver system.

FIG. 2 is a block diagram of a receiver system 150a, which is a specific embodiment of receiver system 150 in FIG. 1. In this embodiment, receiver system 150a includes a receiver unit 154a coupled to an RX data processor 156a.

Within receiver unit 154a, the received signal from antenna 152 is amplified by an amplifier 212 (which may be a low noise amplifier), filtered by a RX filter 214, downconverted from Radio Frequency (RF) down to baseband by a frequency downconverter 216, and digitized by one or more ADCs 218 to provide ADC samples.

A digital pre-processor 220 then processes the ADC samples to provide complex data samples, with each complex sample comprising an Inphase ($I_{IN}$) sample and a Quadrature ($Q_{IN}$) sample. The processing by pre-processor 220 may include sample rate conversion, filtering, and so on. The received signal may be sampled by ADCs 218 at a particular sampling rate, $f_{ADC}$, and RX data processor 156a may operate on samples at another sample rate, $f_{SAMP}$, that may be different from the ADC sampling rate (i.e., $f_{SAMP} \neq f_{ADC}$). For example, the received signal may be sampled at approximately two, four, or eight times the chip rate. For a direct sequence spread spectrum system such as a CDMA system, the chip rate is the rate of a Pseudo-Random Noise (PN) sequence used to spectrally spread the data prior to transmission. The ADC sampling rate may or may not be synchronous with the chip rate. Pre-processor 220 may then be used to perform sample rate conversion to provide data samples at the chip rate or some other sample rate.

In certain designs, it may be advantageous to operate an equalizer within RX data processor 156a at a sample rate that is higher than the ADC sampling rate (e.g., $f_{SAMP} = 2f_{ADC}$). Pre-processor 220 may then be designed to perform upsampling of the ADC samples.

Pre-processor 220 may thus be designed to include an upsampler, a Finite Impulse Response (FIR) filter, and a downsampler. The upsampler would receive and upsample the ADC samples by a factor of P. The FIR filter would then filter the upsampled samples to remove images generated by the upsampling. The FIR filter may further perform match filtering on the samples. The downsampler would then decimate the filtered samples by a factor of Q to provide the data samples at the desired sample rate.

FIG. 2 shows some of the functional elements that may be used to implement receiver unit 154a. In general, receiver unit 154a may include any combination of the functional elements shown in FIG. 2. Moreover, these elements may be arranged in any order to obtain the desired output. For example, multiple stages of amplifiers and filters are typically provided within receiver unit 154a. Different functional elements than those shown in FIG. 2 may also be included within receiver unit 154a. For example, an Automatic Gain Control (AGC) may be implemented to amplify the received signal with the proper gain so that analog signals with the proper amplitude are provided to ADCs 218.

In the embodiment shown in FIG. 2, RX data processor 156a includes an equalizer 230 coupled to a demodulator/decoder 232. Equalizer 230 performs equalization on the data samples to provide equalized symbols, which are then sent to demodulator/decoder 232. Equalizer 230 is described in further detail below. Demodulator/decoder 232 performs demodulation (i.e., symbol de-mapping), deinterleaving, and decoding on the equalized symbols to provide the decoded data.

As used herein, a "sample" corresponds to a value provided for a particular time instant (which is typically related to the sample rate), and a "symbol" corresponds to a unit of transmission (e.g., a modulation symbol). A symbol may span and cover the period for one or multiple samples, depending on the relationship between the symbol rate and sample rate.

An equalizer is typically used to mitigate the deleterious effects of ISI, which is a phenomenon whereby each symbol in a received signal acts as distortion to subsequent symbols in the received signal. ISI may arise from (1) imperfect filtering at the transmitter and/or receiver systems, and (2) a multipath channel between the transmitter and receiver systems. A multipath channel exhibits frequency selective fading, which is characterized by different amounts of signal attenuation across the system bandwidth. The ISI distortion degrades performance by impacting the ability to correctly detect the received symbols.

A LE and a DFE are two equalizer structures that may be used to equalize the received signal. The LE is typically implemented with a tapped-delay line FIR filter that filters the data samples with a particular frequency response to provide the equalized symbols. The DFE is typically implemented with a Feed-Forward Filter (FFF) that filters the data samples on a forward path and a FeedBack Filter (FBF) that filters a finite number of previously detected symbols on a feedback path. The feed-forward and feedback filters may each be implemented as a FIR filter. A DFE with no feedback filter (i.e., with only the feed-forward filter enabled) has the same structure as an LE.

Figure 3:
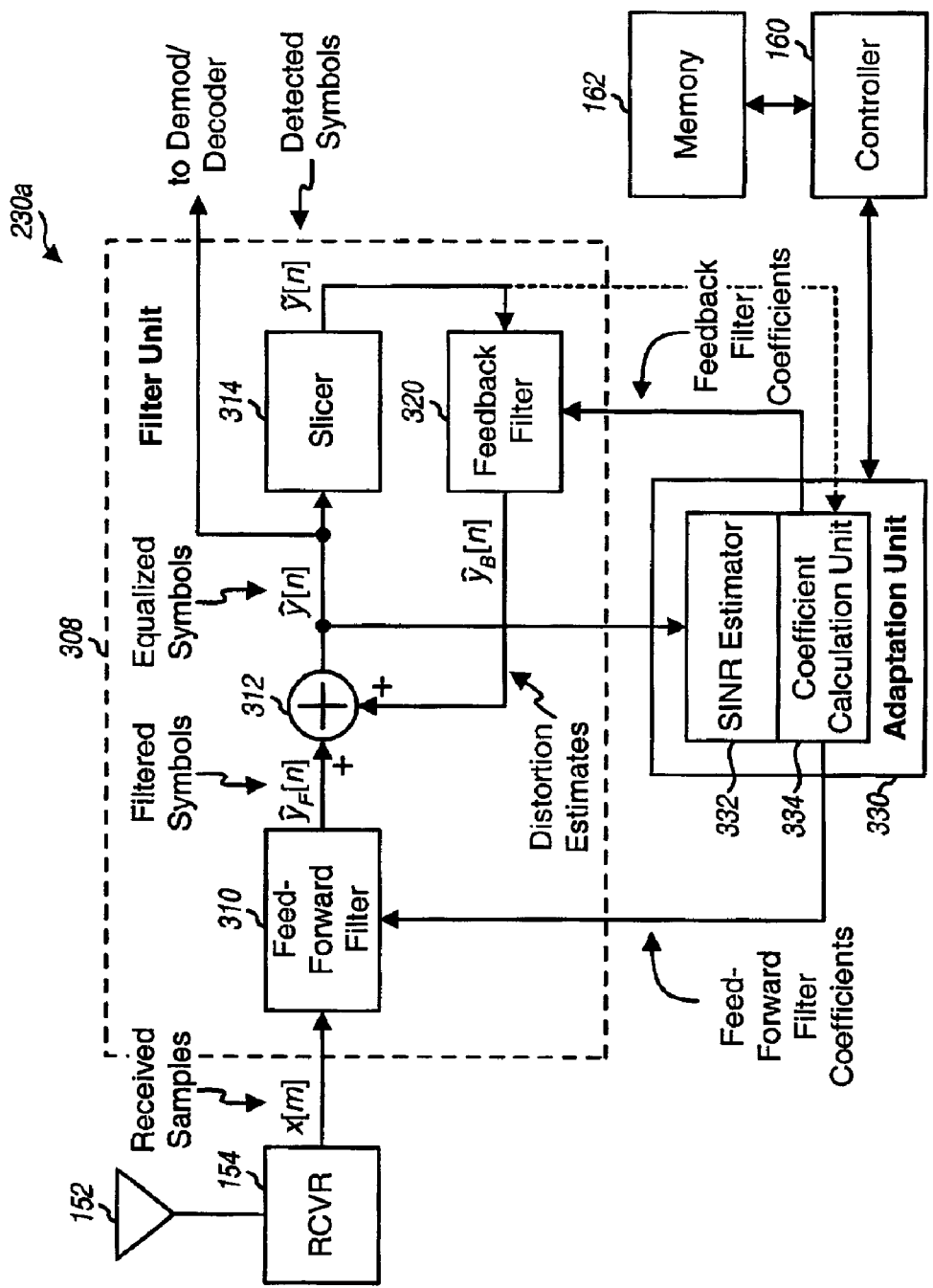
FIG. 3 is a block diagram of an adaptive equalizer that can implement either a DFE or an LE.

FIG. 3 is a block diagram of an adaptive equalizer 230a, which is a specific embodiment of equalizer 230 in FIG. 2. In this embodiment, adaptive equalizer 230a includes (1) a filter unit 308 that may be configured to implement either a DFE or an LE, and (2) an adaptation unit that determines a quality metric for the DFE output and further derives the coefficients for the DFE and LE. Filter unit 308 includes a feed-forward filter 310, a feedback filter 320, a summer 312, and a slicer 314.

As shown in FIG. 3, the data samples, x[m], from receiver unit 154 are provided to feed-forward filter 310, which filters the data samples with a particular filter response to provide filtered symbol, $\hat{y}_F[n]$. The change in indices from m to n is used to indicate a possible change in rate from sample rate to symbol rate. The sample rate of the data samples, x[m], may or may not be equal to the symbol rate of the filtered symbols, $\hat{y}_F[n]$.

Summer 312 receives and sums the filtered symbols, $\hat{y}_F[n]$, from feed-forward filter 310 and distortion estimates, $\hat{y}_B[n]$, from feedback filter 320 to provide equalized symbols, $\hat{y}[n]$. These equalized symbols are estimates of the symbols, y[n], transmitted from the transmitter system via the communication channel to the receiver system. The equalized symbols, $\hat{y}[n]$, include the transmitted symbols, y[n], plus channel noise and other distortions that have not been removed by adaptive equalizer 230a (e.g., uncanceled ISI).

Slicer 314 receives and "slices" the equalized symbols, $\hat{y}[n]$, to provide detected symbols, $\tilde{y}[n]$. The slicing is typically performed based on the same signal constellation used to derive the transmitted symbols. Thus, the detected symbols, $\tilde{y}[n]$, are estimates of the modulation symbols at the transmitter system, prior to the signal conditioning at the transmitter to generate the modulated signal. Either the equalized symbols, $\hat{y}[n]$, or the detected symbols, $\tilde{y}[n]$, may be provided to demodulator/decoder 232 for further processing.

Feedback filter 320 receives and filters the detected symbols, $\tilde{y}[n]$, with a particular filter response to provide the distortion estimates, $\hat{y}_B[n]$, which are estimates of the distortions in the filtered symbols, $\hat{y}_F[n]$, due to ISI and other phenomena.

Adaptation unit 330 receives the equalized symbols, $\hat{y}[n]$, and possibly the detected symbols, $\tilde{y}[n]$. Adaptation unit 330 then determines a set of filter coefficients, $F_i$, for feed-forward filter 310 and another set of filter coefficients, $B_k$, for feedback filter 320. In the embodiment shown in FIG. 3, adaptation unit 330 includes a SINR estimator 332 and a coefficient calculation unit 334. SINR estimator 332 determines a quality metric for the equalizer output, which may relate to the SINR of the equalized symbols, $\hat{y}[n]$. Adaptive equalizer 230a may be configured to implement either a DFE or an LE, based on the quality metric, as described below.

Coefficient calculation unit 334 determines the filter coefficients for the DFE or the LE, depending on which equalizer is being implemented by adaptive equalizer 230a. Coefficient calculation unit 334 implements one or more algorithms that adapt the filter coefficients to the proper values based on one or more criteria. For example, the filter coefficients may be adapted based on the criteria of minimizing a Mean Square Error (MSE) between known symbols (e.g., pilot symbols) and the equalizer's estimates of these symbols. Two common examples of adaptive MSE algorithms are the Least Mean Square (LMS) algorithm and the Recursive Least Square (RLS) algorithm. For the same number of filter taps, an equalizer updated using the RLS algorithm typically converges faster than an equalizer updated using the LMS algorithm. However, the RLS algorithm is more complex to implement.

The elements of equalizer 230a are described in further detail below.

Figure 4:
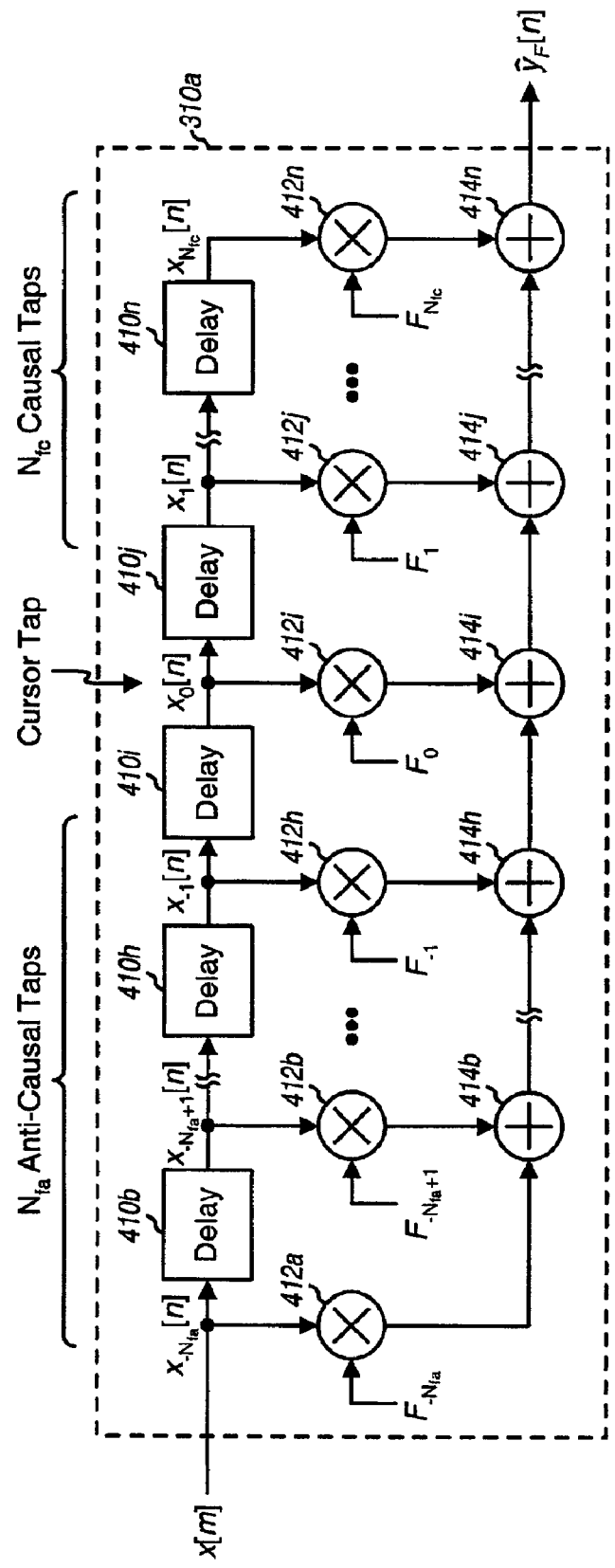
FIG. 4 is a block diagram of a feed-forward filter for the DFE.

FIG. 4 is a block diagram of a feed-forward filter 310a, which is an embodiment of feed-forward filter 310 in FIG. 3. In this embodiment, feed-forward filter 310a is implemented with a FIR filter having $N_f$ taps. Each tap corresponds to a data sample for a particular sample period. One of the $N_f$ taps is designated as a "cursor" tap, which is the tap corresponding to a data sample designated as corresponding to the current symbol period. The data sample for the cursor tap is referred to as the cursor sample. The $N_f$ taps would then include $N_{fa}$ anti-causal taps, $N_{fc}$ causal taps, and the cursor tap (i.e., $N_f=N_{fa}+N_{fc}+1$). An anti-causal tap is one in which the corresponding data sample arrives after (or later than) the cursor sample. A causal tap is one in which the corresponding data sample arrives before (or prior to) the cursor sample.

As shown in FIG. 4, the data samples, x[m], are provided to a number of ($N_f$−1) delay elements 410b through 410n. Each delay element 410 provides one sample period ($T_{sam}$) of delay. One of the taps is denoted as the cursor tap. The $N_{fa}$ anti-causal taps are located to the left of the cursor tap, and the $N_{fc}$ causal taps are located to the right of the cursor tap. The input data sample, x[m], and the outputs from delay elements 410b through 410n collectively represent the data samples for the $N_f$ taps (i.e., the contents of the FIR filter).

For each symbol period, the data samples for the Nf taps are provided to multipliers 412a through 412n. Each multiplier 412 receives a respective data sample, which is denoted as $x_i[n]$, and further receives a respective filter coefficient $F_i$, where i represents the tap index and i=$N_{fa}$ ... −1, 0, 1, ... $N_{fc}$. Each multiplier 412 multiplies the received data sample $x_i[n]$ with the received coefficient $F_i$ to provide a corresponding scaled sample. The $N_f$ scaled samples from multipliers 412a through 412n are then summed by adders 414b through 414n to provide a filtered symbol, $\hat{y}_F[n]$, for that symbol period.

The filtered symbol, $\hat{y}_F[n]$, may be expressed as:

$$\hat{y}_F[n] = \sum_{i=N_{fa}}^{N_{fe}} (F_i)^* x_i[n], \qquad \text{Eq (1)}$$

where $(F_i)^*$ represents the complex-conjugate of $F_i$. As shown in equation (1), if the cursor tap is denoted by the index i=0, then the summation is performed over $N_f$ data samples, which include $N_{fc}$ causal samples, $N_{fa}$ anti-causal samples, and the cursor sample. If the communications channel introduces no ISI, then only the cursor tap (i.e., i=0) would be required to provide the filtered symbol, $\hat{y}_F[n]$.

If the feed-forward filter is "symbol-spaced," then each delay element 410 provides one symbol period ($T_{sym}$) of delay. In that case, the indices m and n both denote symbol period and x[n]=x[m]. The data sample for the i-th tap may then be expressed as $x_i[n]=x[n-i+D]$, where D is an amount of delay suitably chosen such that the cursor sample is at the desired tap location within the feed-forward filter.

If the feed-forward filter is "sample-spaced," then each delay element 410 provides one sample period ($T_{sam}$) of delay. In that case, the index m denotes sample period and the index n denotes symbol period. The data sample for the i-th tap may then be expressed as $x_i[n]=x[m-i+D]$, where D is again an amount of delay suitably chosen such that the cursor sample is at the desired tap location within the feed-forward filter.

Feed-forward filter 310a provides one filtered symbol for each symbol period regardless of whether the filter is sample-spaced or symbol-spaced. For a sample-spaced feed-forward filter, each data sample, x[m], is shifted by R delay elements 410 for each symbol period, where R is the ratio of symbol rate to sample rate. For example, if the sample rate is twice the symbol rate, then each data sample, x[m], is shifted to the right by two delay elements 410 for each symbol period, and one filtered symbol, $\hat{y}_F[n]$, is derived for every two sample periods.

Figure 5:
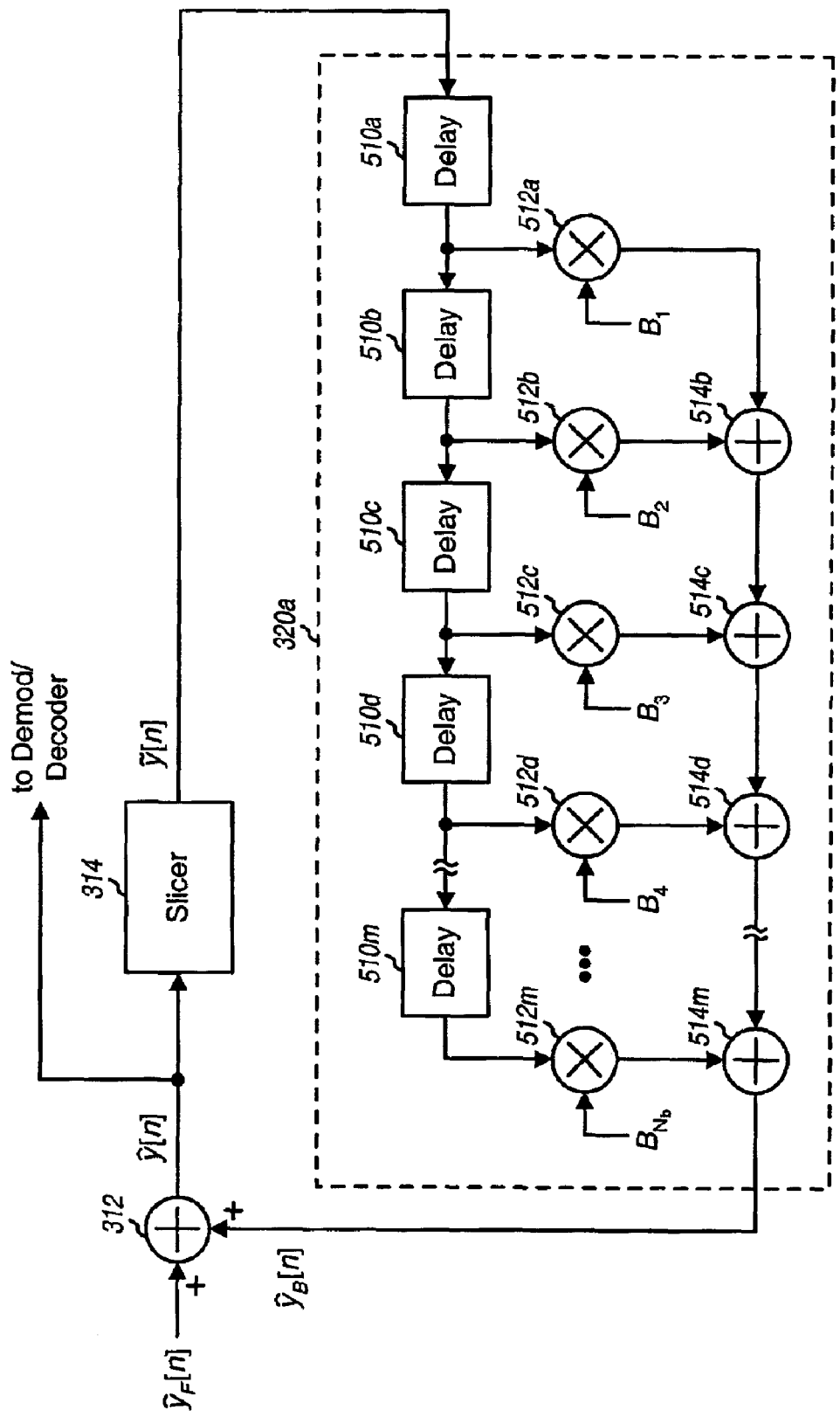
FIG. 5 is a block diagram of a feedback filter for the DFE.

FIG. 5 is a block diagram of a feedback filter 320a, which is an embodiment of feedback filter 320 in FIG. 3. In this embodiment, feedback filter 320a is implemented with a FIR filter having $N_b$ taps. Feedback filter 320a operates on $N_b$ previously detected symbols, $\tilde{y}[n-1]$ through $\tilde{y}[n-N_b]$, to provide the distortion estimate, $\hat{y}_B[n]$, for the current symbol period.

As shown in FIG. 5, the detected symbols, $\tilde{y}[n]$, are provided to a number of ($N_b$) delay elements 510a through 510m. Each delay element 510 provides one symbol period ($T_{sym}$) of delay. For each symbol period, the outputs from delay elements 510a through 510m (which represent the detected symbols for the $N_b$ taps) are provided to multipliers 512a through 512m, respectively. Each multiplier 512 receives a respective detected symbol, which is denoted as $\tilde{y}[n-k]$, and further receives a respective coefficient $B_k$, where k represents the tap index and k=1, 2, ... $N_b$. Each multiplier 512 multiplies the received symbol $\tilde{y}[n-k]$ with the received coefficient $B_k$ to provide a corresponding scaled symbol. The $N_b$ scaled symbols from multipliers 512a through 512m are then summed by adders 514b through 514m to provide the distortion estimate, $\hat{y}_B[n]$, for that symbol period.

The distortion estimate, $\hat{y}_B[n]$, may be expressed as:

$$\hat{y}_B[n] = \sum_{k=1}^{N_b} (B_k)^* \tilde{y}[n-k]. \quad \text{Eq (2)}$$

In general, the feed-forward and feedback filters may each be implemented with any number of taps. More taps allow these filters to better correct for frequency distortion in the received signal and to process multipaths having larger time offsets. However, more taps correspond to increased complexity, more computations to adapt the taps, and possibly longer convergence time. The number of taps is thus a design choice and is selected based on a number of factors such as, for example, costs, performance, complexity, and so on.

For each symbol period, summer 312 receives and sums the filtered symbol, $\hat{y}_F[n]$, and the distortion estimate, $\hat{y}_B[n]$, to provide the equalized symbol, $\hat{y}[n]$, for that symbol period. The equalized symbol, $\hat{y}[n]$, may be expressed as:

$$\hat{y}[n]=\hat{y}_F[n]+\hat{y}_B[n]. \quad \text{Eq (3)}$$

Summer 312 provides the equalized symbols to slicer 314, which then slices each equalized symbol to provide a corresponding detected symbol. Each equalized symbol is an estimate of a modulation symbol transmitted from the transmitter system, and slicer 314 slices the equalized symbol based on the same signal constellation used at the transmitter system to derive the modulation symbol. The signal constellation for an M-ary modulation scheme includes $2^M$ signal points. Each signal point is associated with a specific M-bit value and corresponds to a modulation symbol to be transmitted for that M-bit value. The transmitted modulation symbol is degraded by channel noise and further distorted by ISI and other phenomena. At the receiver system, the received symbol (after equalization) for the transmitted symbol is not likely to be at the same point in the signal constellation. For each equalized symbol, slicer 314 typically maps the equalized symbol to a specific location on the signal constellation and then provides a modulation symbol corresponding to a signal point on this signal constellation that is nearest to the location of the equalized symbol. This modulation symbol represents the detected symbol for the equalized symbol.

Since the equalized symbol, $\hat{y}[n]$, is typically a complex symbol having an inphase component and a quadrature component, slicer 314 may perform the slicing on each component individually. The detected symbol, $\tilde{y}[n]$, would then comprise the sliced inphase and quadrature components.

Referring back to FIG. 3, adaptation unit 330 receives the equalized symbols, $\hat{y}[n]$, and possible the detected symbols, $\tilde{y}[n]$, as shown by the dashed line. Adaptation unit 330 then derives and updates the coefficients for feed-forward filter 310 and feedback filter 320 based on a particular adaptive algorithm, which may be the LMS algorithm, Normalized Least Mean Square (NLMS) algorithm, RLS algorithm, Direct Matrix Inversion (DMI) algorithm, or some other adaptive algorithm. Each of the LMS, NLMS, RLS, and DMI algorithms (directly or indirectly) attempts to minimize the MSE between the equalized symbols, $\hat{y}[n]$, and the expected symbols, y[n].

The symbol error, e[n], may be expressed as:

$$e[n]=y[n]-\hat{y}[n]. \quad \text{Eq (4)}$$

and the mean square error may be expressed as:

$$MSE=E\{|e[n]|^2\}, \quad \text{Eq (5)}$$

where $E\{\alpha\}$ is the expected value of $\alpha$.

In many communication systems, pilot symbols that are known to the receiver are transmitted during part of a frame to enable the adaptation of the coefficients at the receiver. If the coefficient adaptation is performed during periods when the pilot symbols are transmitted, then the pilot symbols are the expected symbols. Additionally or alternatively, the adaptation may be performed during periods when data is transmitted. In this case, the symbol error may be derived as $e[n]=\hat{y}[n]-\tilde{y}[n]$, where the detected symbols are used as the expected symbols.

The derivation of the coefficients for a FIR filter based on the LMS, RLS, and DMI algorithms is described below. For the following derivation, $\underline{R}[n]$ denotes the contents of the FIR filter (i.e., the samples or symbols for all taps of the FIR filter), $\underline{H}[n]$ denotes the vector of coefficients for the FIR filter, and e[n] denotes the error between the filter output and the expected value, all of which are given for the n-th symbol period.

For the LMS algorithm, the updated coefficients for the next symbol period (n+1) may be computed as:

$$\underline{H}[n+1]=\underline{H}[n]+\underline{R}[n]\cdot\Delta\cdot e^*[n] \quad \text{Eq (6)}$$

where $\Delta$ is a unit-less step-size parameter. The step-size parameter for the LMS algorithm controls the tradeoff between adaptation speed and misadjustment error (which is also referred to as excess MSE). If the step size is set too large, then the algorithm may not converge. Alternatively, if the step size is set too small, then the algorithm may converge too slowly.

The step size may be static or may be dynamically adjusted. For example, the step size may be set to a larger value during the early stage of adaptation when a larger amount of error may be present, and may thereafter be set to a smaller value during the later stage of adaptation when a smaller amount of error may be present. The same step size may be used for all coefficients. Alternatively, different step sizes may be used for different coefficients. For example, the coefficient for the cursor tap is typically larger and a larger step size may be used for this coefficient, while the coefficients for the remaining taps may be smaller and a smaller step size may be used for these coefficients.

For the RLS algorithm, the updated coefficients for the next symbol period may be computed as:

$$\underline{K}[n] = \frac{\lambda^{-1}\underline{\underline{J}}[n]\underline{R}[n]}{1+\lambda^{-1}\underline{R}^H[n]\underline{\underline{J}}[n]\underline{R}[n]}, \quad \text{Eq (7)}$$

$$\underline{H}[n+1] = \underline{H}[n] + \underline{K}[n]e^*[n], \text{ and}$$

$$\underline{\underline{J}}[n+1] = \lambda^{-1}\left(\underline{\underline{I}} - \underline{K}[n]\underline{R}^H[n]\right)\underline{\underline{J}}[n],$$

where $\lambda$ is a memory weighting factor (typically, $0.95<\lambda\leq1.0$), $\underline{R}^H[n]$ is the Hermitian transpose (i.e., complex conjugate and transpose) of $\underline{R}[n]$, $\underline{K}[n]$ is a gain vector, $\underline{\underline{J}}[n]$ is an inverse correlation matrix, and $\underline{\underline{I}}$ is the identity matrix (i.e., ones along the diagonal and zeros elsewhere).

Initially, $\underline{\underline{J}}[n]$ may be set as $\underline{\underline{J}}[0]=\delta\underline{\underline{I}}$, where $\delta$ is a small positive number (e.g., $\delta=0.001$).

For the DMI algorithm, the updated coefficients for the next symbol period may be computed with N samples, as follows:

$$\underline{\underline{R}}[n] = \frac{1}{N}\sum_{i=n-N+1}^{n} \underline{R}[i]\underline{R}^H[i], \quad \text{Eq (8)}$$

$$\underline{G}[n] = \frac{1}{N}\sum_{i=n-N+1}^{n} \underline{R}[i]y^*[i], \text{ and}$$

$$\underline{H}[n+1] = \left(\underline{\underline{R}}[n]\right)^{-1}\underline{G}[n],$$

where $\underline{\underline{R}}[n]$ is an estimate of the autocorrelation matrix of the FIR filter contents, $\underline{R}[n]$, and $\underline{G}[n]$ is a cross-correlation vector of the filter contents and the expected output, y[n]. The estimates $\underline{\underline{R}}[n]$ and $\underline{G}[n]$ may be computed based on samples for multiple (possibly disjoint) time intervals. The matrix inversion of $\underline{\underline{R}}[n]$ in equation (8) may be performed only as often as necessary.

The LMS, NLMS, RLS, DMI, and other adaptive algorithms are described in further detail by Simon Haykin in a book entitled "Adaptive Filter Theory", 3rd edition, Prentice Hall, 1996, and by B. Widrow and S. D. Stems in a book entitled "Adaptive Signal Processing," Prentice-Hall Inc., Englewood Cliffs, N.J., 1986. The relevant sections of these books are incorporated herein by reference.

In a specific embodiment, the coefficients for feed-forward filter 310 and feedback filter 320 are updated based on the LMS algorithm. For LMS adaptation, the updated coefficients for the feed-forward filter may be expressed as:

$$F_i[n+1]=F_i[n]+x_i[n]\cdot\Delta\cdot e^*[n], \text{ for } i=N_{fa}\ldots-1,0,1,\ldots N_{fc}, \quad \text{Eq (9)}$$

and the updated coefficients for the feedback filter may be expressed as:

$$B_k[n+1]=B_k[n]+\hat{y}[n-k]\cdot\Delta\cdot e^*[n], \text{ for } k=1,2,\ldots N_b. \quad \text{Eq (10)}$$

As shown in equations (9) and (10), the same symbol error e[n] and the same step size $\Delta$ may be used to update both the feed-forward and feedback filters. The symbol error e[n] may be derived based on known symbols (e.g., pilot symbols), in which case e[n]=y[n]−ŷ[n] as shown in equation (4), or based on the detected symbols, in which case e[n]=ỹ[n]−ŷ[n]. Different step sizes may also be used for the feed-forward and feedback filters.

The DFE can provide improved performance under certain operating conditions. In particular, the feedback filter of the DFE can remove post-cursor ISI without noise enhancement when the symbols used to derive the distortion estimates are correct. Post-cursor ISI refers to the ISI distortions in the symbols received after the cursor symbol. If the detected symbols provided to the feedback filter are reliable, then the DFE will generally outperform the LE.

However, when the uncoded symbol error rate is high, the performance of the DFE suffers from error propagation. In particular, if the error rate of the detected symbols provided to the feedback filter is high, then the distortion estimates would not be accurate because of the incorrect symbols. Any error in the distortion estimates would itself act as additional distortion that generally increases the likelihood of making errors on subsequently detected symbols.

For a coded communication system, the detected symbols are further processed (e.g., deinterleaved and decoded) to provide the decoded data. The decoded data may then be re-encoded and re-modulated to provide remodulated symbols. Similar to the detected symbols, the remodulated symbols are also estimates of the transmitted symbols, but typically have a lower symbol error rate because of the error correcting code. The remodulated symbols may then be provided to the feedback filter instead of the detected symbols. However, the additional delays to decode, re-encode, and re-modulate the symbols are typically too excessive, and the symbols provided to the feedback filter are typically the (uncoded) detected symbols.

Techniques are provided herein for determining a quality metric for the equalizer output, selecting either the DFE or LE for use depending on the quality metric, and quickly and efficiently determining the filter coefficients for the selected equalizer. These techniques may be used to advantageously select the DFE for equalizing the received signal when the quality metric is sufficiently high (e.g., when the error rate of the detected symbols is sufficiently low) and to select the LE when the quality metric is low.

Figure 6:
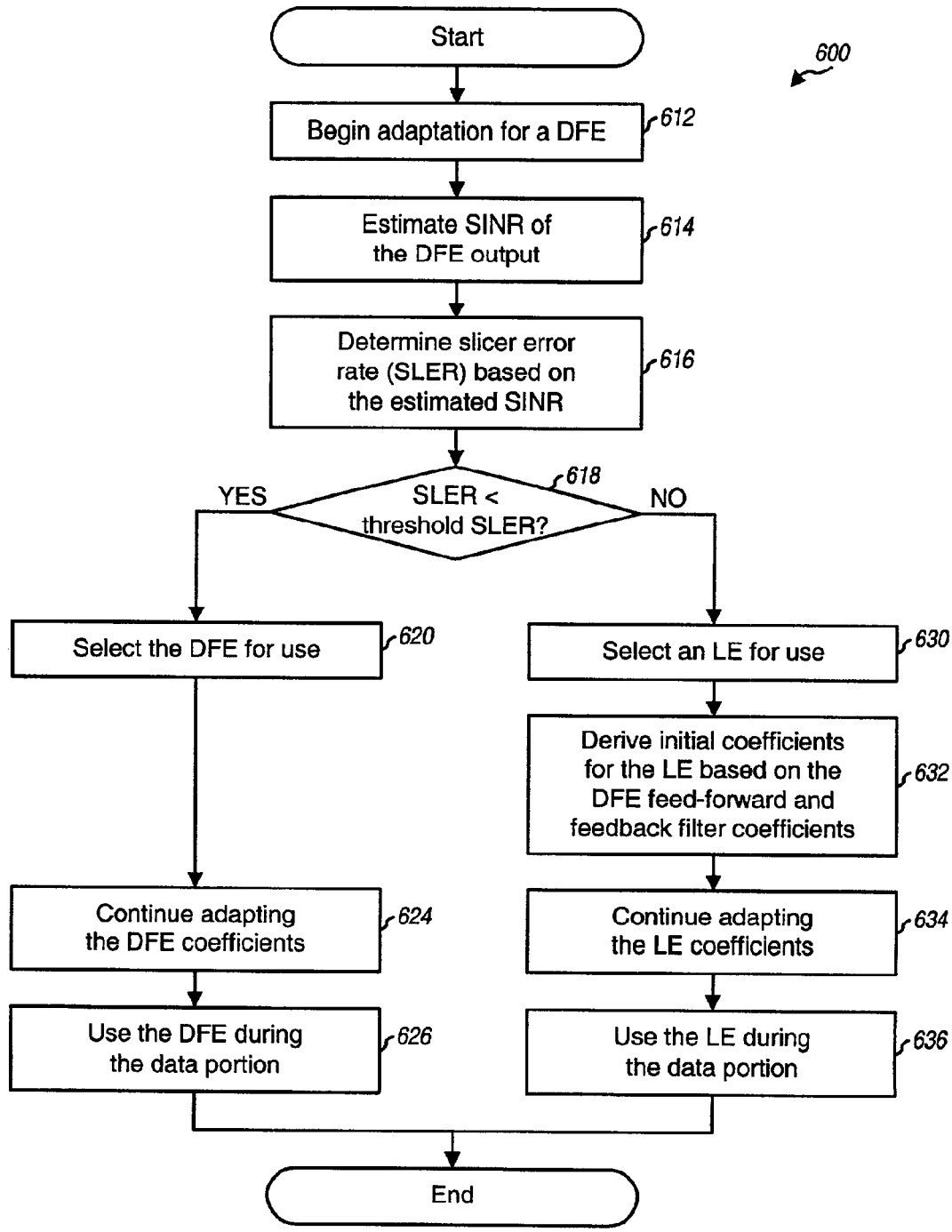
FIG. 6 is a flow diagram of an embodiment of a process for selecting either the DFE or LE for use.

FIG. 6 is a flow diagram of an embodiment of a process 600 for selecting either a DFE or an LE for use depending on a quality metric for the equalizer output. For this embodiment, the adaptive equalizer is capable of implementing either the DFE or the LE at any given moment.

Referring back to FIG. 3, adaptive equalizer 230a can implement a DFE by enabling both feed-forward filter 310 and feedback filter 320, and can implement an LE by enabling the feed-forward filter and disabling the feedback filter.

In the embodiment shown in FIG. 6, the DFE is initially selected, and the coefficients of the DFE are adapted with parameters $N_{fa}$ and $N_{fc}$ for the feed-forward filter and $N_b$ for the feedback filter (step 612). The coefficients may be adapted using the LMS algorithm and as shown in equations (9) and (10).

After a particular amount of time has elapsed, a quality metric is determined for the DFE output. In an embodiment, the quality metric relates to the SINR of the equalized symbols. To estimate the SINR (step 614), the MSE between the equalized symbols and the expected symbols is first computed, as follows:

$$MSE = \frac{1}{L}\sum_{n=1}^{L}|y(n) - \hat{y}(n)|^2, \quad\quad \text{Eq (11)}$$

where L is the number of symbols over which the error is accumulated to provide the MSE. The mean square error may also be determined between the equalized symbols and the detected symbols $$\left(i.e., MSE = \frac{1}{L}\sum_{n=1}^{L}|\tilde{y}(n) - \hat{y}(n)|^2\right),$$

if these symbols are not known at the receiver. Typically, the mean square error is averaged over a sufficient number of symbols to obtain the desired level of confidence in the MSE value. In alternative embodiments, the MSE may also be any suitable measure of the average of $y(n)-\hat{y}(n)$ (e.g., linear average, exponential average, and so on).

The variance $\sigma_y^2$ of the modulation symbols (i.e., the symbols in the signal constellation) may also be computed as:

$$\sigma_y^2 = \frac{1}{L}\sum_{n=1}^{L}|y(n)|^2. \quad\quad \text{Eq (12)}$$

The SINR of the equalized symbols may then be determined based on the equalized symbol variance and the mean square error, as follows:

$$SINR = \frac{\sigma_y^2}{MSE} - 1 \text{ linear} \quad\quad \text{Eq (13)}$$
$$= 10\log\left(\frac{\sigma_y^2}{MSE} - 1\right) \text{dB}.$$

The SINR may be determined by SINR estimator 332 in FIG. 3.

The SINR of the DFE output is determined after a particular amount of time has elapsed. This elapsed time is referred to as the initial training period, which is a fraction of the entire training period available to adapt the equalizer coefficients.

The SINR of the DFE output during the initial training period may be used to predict the SINR of the DFE output during the data portion of the frame. The predicted SINR would be accurate if the communication channel does not change appreciably between the training period and the data portion. The signal constellation used during the training period may or may not be the same as the signal constellation used for the data portion. If the constellations are different, then the predicted SINR may be adjusted to account for the difference. The amount of adjustment in SINR may be determined by computer simulation, empirical measurements, or some other means.

In an embodiment, the predicted SINR for the data portion of the frame is then mapped to a Slicer Error Rate (SLER) expected during the data portion (step 616). This SLER accounts for error propagation in the DFE. The mapping may be achieved based on a table of SLERs versus SINRs. This table may be derived for each signal constellation based on computer simulation, empirical measurements, or some other means.

A determination is then made whether or not the predicted SLER of the detected symbols provided to the feedback filter during the data portion is less than a threshold SLER (step 618). Because a DFE suffers from error propagation, the DFE is selected for use only if the predicted SLER is sufficiently low, since the error propagation will be negligible in this case. Otherwise, an LE is selected for use if the predicted SLER is high. The threshold SLER may be selected based on various parameters for the communication system in which the adaptive equalizer is used. Such parameters may include, for example, the lengths of the data packets, the sizes of the filters, and signal constellations used to derive the symbols, and so on. The threshold SLER may be determined based on computer simulation, empirical measurements, or some other means. A conservative (or smaller) value may be selected for the threshold SLER to favor the use of the LE over the DFE.

If the predicted SLER is less than the threshold SLER, as determined in step 618, then the DFE is selected for use during the data portion of the frame (step 620). The adaptation of the coefficients for the feed-forward and feedback filters then continues for the remainder of the training period to further improve these coefficients (step 624). The adaptation of the DFE coefficients may cease at the end of the training period or when the DFE is used to equalize the data samples during the data portion. Alternatively, the adaptation of the DFE coefficients may continue, using the detected symbols instead of the known symbols, even when the DFE is used to equalize the data samples during the data portion. In either case, the DFE is used to equalize the data samples during the data portion (step 626).

Alternatively, back in step 618, if the predicted SLER is greater than or equal to the threshold SLER, then the LE is selected for use during the data portion of the frame (step 630). For the equalizer structure shown in FIG. 3, the LE may be implemented by disabling feedback filter 320. This may be achieved by setting the feedback filter coefficients to zeros (i.e., $B_k=0.0$, for all k) or by setting the feedback filter length to zero (i.e., $N_b=0$). In an embodiment, the coefficients of the feed-forward and feedback filters are then used to derive the initial values for the coefficients of the FIR filter for the LE (step 632). The derivation of the initial coefficients for the LE is described in further detail below. In another embodiment, the coefficients of the LE are derived based only on the coefficients of the feed-forward filter. The length of the LE FIR filter may also be selected to provide good performance. The remainder of the training period is then used to adapt the LE coefficients (and not the DFE coefficients) (step 634). Again, the adaptation of the LE coefficients may (1) cease at the end of the training period or when the LE is used to equalize the data samples during data portion, or (2) continue even when the LE is used. In either case, the LE is used to equalize the data samples during the data portion (step 636).

In the above description for FIG. 6, the predicted SLER is used to select either the DFE or LE for use during the data portion. Other quality metrics may also be used to select an equalizer, and this is within the scope of the invention. For example, the estimated SINR may be compared against an SIR threshold and used to select the equalizer. As another example, the mean square error between the equalized symbols and the detected symbols (i.e., $MSE=E\{|\hat{y}[n]-\tilde{y}[n]|^2\}$ or the mean square error between the equalized symbols and known symbols, such as pilot symbols, (i.e., $MSE=E\{|y[n]-\hat{y}[n]|^2\}$ may be compared against a mean square error threshold and used to select the equalizer.

In the above description, an adaptive equalizer capable of implementing either the DFE or the LE at any given moment is used to implement the DFE initially. The quality of the DFE output is then determined at the end of the initial training period and compared against a threshold value. Alternatively, an adaptive equalizer may be designed with the capability to implement both the DFE and LE concurrently. For this design, the DFE and LE may both be adapted during the initial training period. A quality metric may then be determined for both the DFE and LE at the end of this training period, and the equalizer with the better quality metric may then be selected for use.

In an aspect, the coefficients of the FIR filter for the LE are initially derived (or approximated) based on the coefficients of the feed-forward and feedback filters for the DFE. Since the entire training period is typically of finite duration and a portion of this training period is used to adapt the DFE initially, only a shortened period of time may be available to adapt the LE coefficients. With a shortened training period, a properly selected set of initial values for the LE coefficients may significantly improve the quality of these coefficients at the end of the training period.

Figure 7:
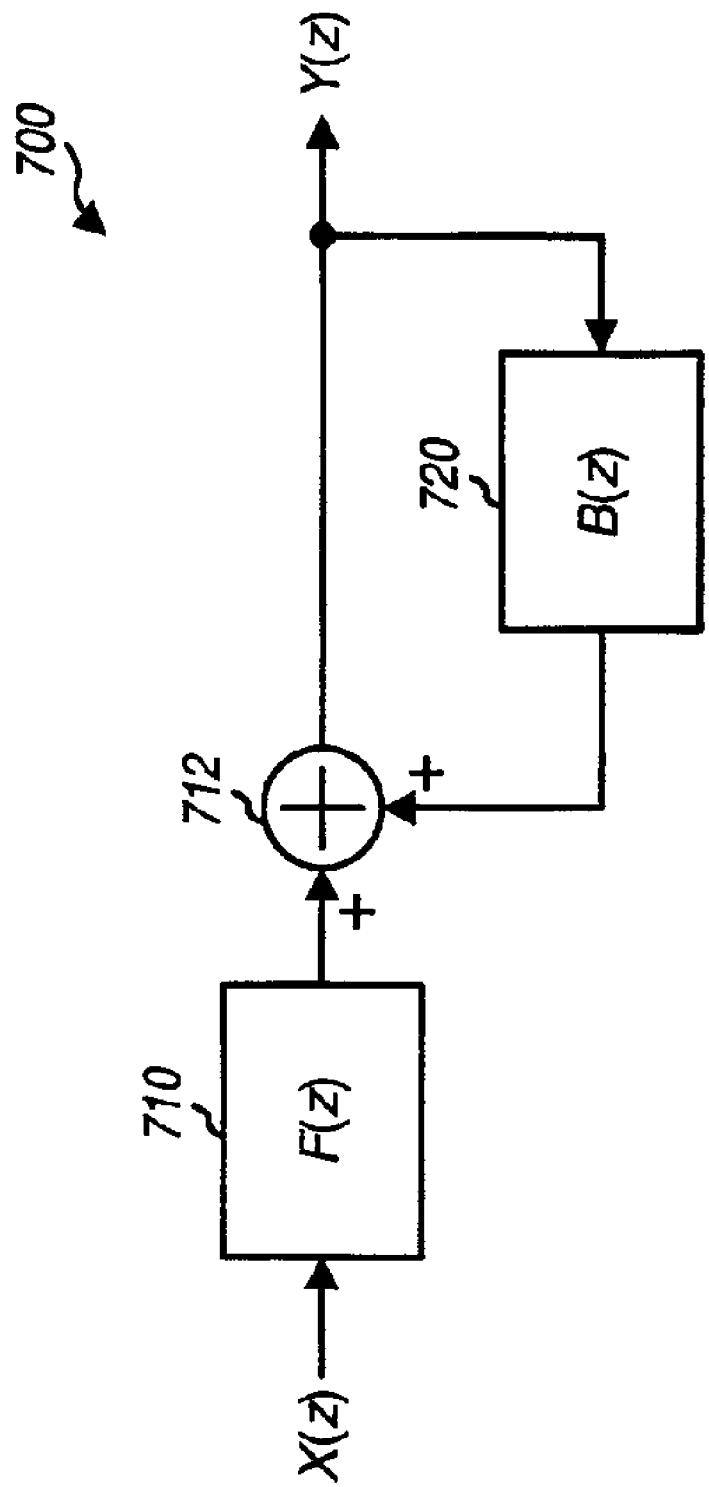
FIG. 7 is a block diagram of a simplified model of the DFE.

FIG. 7 is a block diagram of a simplified model of a DFE 700, which does not include the slicer. This DFE model includes a feed-forward filter 710, a feedback filter 720, and a summer 712.

For this DFE model, the feed-forward and feedback filters are each implemented with a symbol-spaced FIR filter. Feed-forward filter 710 has a z-domain filter response of $F(z)$ and operates on current and prior input samples, $X(z)$, and feedback filter 720 has a z-domain filter response of $B(z)$ and operates on prior equalized samples, $Y(z)$. The filter response of the feedback filter may be expressed as:

$$B(z)=B_1 z^{-1}+B_2 z^{-2}+\ldots+B_{N_b} z^{-N_b}, \quad \text{Eq (14)}$$

where $z^{-k}$ denotes a delay of k symbol periods, and $B_k$ is the coefficient for the k-th filter tap.

The equalized sample, $Y(z)$, from DFE 700 may be expressed as:

$$Y(z)=X(z)F(z)+Y(z)B(z). \quad \text{Eq (15)}$$

Rearranging the terms in equation (15), the equalized sample may be expressed as:

$$Y(z) = X(z)F(z)\left(\frac{1}{1-B(z)}\right). \quad \text{Eq (16)}$$

The equalized sample from an LE may be expressed as:

$$Y(z)=X(z)L(z), \quad \text{Eq (17)}$$

where $L(z)$ is the filter response of the FIR filter for the LE.

The filter response for the LE may thus be derived from the filter responses of the feed-forward and feedback filters for the DFE, by combining equations (16) and (17), as follows:

$$L(z) = F(z)\left(\frac{1}{1-B(z)}\right). \quad \text{Eq (18)}$$

Equation (18) may be solved by various methods to derive the coefficients for the LE. In one method that can approximate equation (18) efficiently, the first $N_m$ of the $N_b$ feedback filter coefficients (with $N_m \leq N_b$) are used to form a power series, $M(z)$, as follows:

$$M(z) = \frac{1}{1-B_1 z^{-1}-B_2 z^{-2}-\ldots-B_{N_m} z^{-N_m}} = \quad \text{Eq (19)}$$
$$1+M_1 z^{-1}+M_2 z^{-2}+\ldots.$$

Since $M(z)$ may not have a finite number of terms, a truncated power series, $\hat{M}(z)$, may be formed by truncating the power series, $M(z)$, after $N_d$ terms. The truncated power series, $\hat{M}(z)$, may be expressed as:

$$\hat{M}(z)=1+M_1 z^{-1}+M_2 z^{-2}+\ldots+M_{N_d} z^{-N_d}. \quad \text{Eq (20)}$$

The initial values for the LE coefficients may then be derived as:

$$\hat{L}(z)=F(z)\hat{M}(z). \quad \text{Eq (21)}$$

Typically, $N_m$ and $N_d$ are fixed values, in which case the calculation of $\hat{M}(z)$ is a fixed function of $B_1, B_2, \ldots, B_{N_m}$. As a specific example, if $N_m=2$ then the coefficients for the first two feedback filter taps are taken into account. And if $N_d=3$, then the power series, $M(z)$, is truncated after the third term. Using long division, the truncated power series, $\hat{M}(z)$, for this example may then be expressed as:

$$\hat{M}(z)=1+B_1 z^{-1}+(B_1^2+B_2)z^{-2}+(B_1^3+2B_1 B_2)z^{-3}. \quad \text{Eq (22)}$$

Since the initial filter response $\hat{L}(z)$ for the LE is derived by multiplying the filter response $F(z)$ for the feed-forward filter with the truncated power series $\hat{M}(z)$, as shown in equation (21), the length of the LE filter response is equal to the length of the feed-forward filter response plus the length of the truncated power series (i.e., $N_{1e}=N_f+N_d$). For the adaptive filter architecture shown in FIG. 3, the FIR filter for the LE may be implemented using feed-forward filter 310.

Since the $N_d$ terms of the power series are selected to approximate the effect of the feedback filter, the feed-forward filter may be grown by $N_d$ taps from $N_f$ to $N_f+N_d$. Moreover, since the feedback filter removes post-cursor ISI (i.e., ISI distortion after the cursor sample), the feed-forward filter may be grown in the causal direction. This may be achieved by keeping $N_{fa}$ and the cursor tap position fixed, and increasing $N_{fc}$ to $N_{fc}+N_d$ by appending $N_d$ additional delay elements after the last delay element in the feed-forward filter. Alternatively, the LE FIR filter may be implemented with less than $N_{fc}+N_d$ taps by truncating a sufficient number of taps for $\hat{L}(z)$ in the causal direction, the anti-causal direction, or both the causal and anti-causal directions.

In an alternative embodiment, the coefficients for the LE are derived based only on the coefficients of the feed-forward filter. For example, the feed-forward filter coefficients may be used directly for the LE coefficients, without performing the calculations described above.

The process for selecting a particular equalizer for use and adapting the filter coefficients for the selected equalizer, as shown in FIG. 6, may be performed as often as necessary. In one embodiment, the process is performed for each training period, which may correspond to the period when pilot symbols are transmitted. In another embodiment, the process is performed whenever the SENR of the equalizer output has changed a sufficient amount to merit re-evaluation of the equalizer. In yet another embodiment, the process is performed periodically at regular time interval. In yet another embodiment, the process is performed whenever directed, which may be triggered by occurrence of one or more defined events (e.g., detected change in the operating conditions). For all these embodiments, the derivation of the initial LE filter coefficients, as shown in equation (21), occurs once each time the process is performed and only if the LE is selected for use.

For simplicity, the DFE model shown in FIG. 7 and described above assumes that the feed-forward and feedback filters are both symbol-spaced. The techniques for deriving the initial LE filter coefficients may also be applied when the feed-forward filter is fractionally spaced with respect to the feedback filter. For example, the taps of the feed-forward filter may be spaced every half symbol and the taps of the feedback filter may be spaced every symbol (i.e., $T_{sam}=T_{sym}/2$). In this case, a set of coefficients is initially determined for the feedback filter for the same sample rate as that of the feed-forward filter. This set would include the feedback filter coefficients at symbol timing. The remaining coefficients in this set may be (1) set to zero (i.e., zero-filled), (2) derived by interpolating other coefficients, or (3) derived by some other means.

The equalizer (e.g., DFE or LE) can effectively reduce ISI due to frequency selective fading. For an MMSE equalizer, this is achieved by providing a filter response that is approximately the inverse of the frequency response of the communication channel while attempting to minimize the overall noise, which includes the output additive noise and residual ISI distortion.

The equalization techniques described herein may be used for various wireless communication systems. For example, these techniques may be used for CDMA, TDMA, and FDMA communication systems. These techniques may also be used for wireless LAN communication systems, such as those that conform to the IEEE standard 802.11b.

The equalization techniques described herein may be implemented by various means. For example, these techniques may be implemented in hardware, software, or a combination thereof. For a hardware implementation, the elements used to implement any one or a combination of the techniques (e.g., the FIR filters, the adaptation unit, and so on) may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, other electronic units designed to perform the functions described herein, or a combination thereof.

For a software implementation, the equalization techniques may be implemented with modules (e.g., procedures, functions, and so on) that perform the functions described herein. The software codes may be stored in a memory unit (e.g., memory 162 in FIGS. 1 and 3) and executed by a processor (e.g., controller 160). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for equalizing a received signal in a wireless communication system, comprising:
    adapting a decision feedback equalizer (DFE) based on the received signal for an initial time period;
    determining a quality metric for an output of the DFE;
    selecting periodically the DFE for use to equalize the received signal if the quality metric is better than a threshold value;
    selecting periodically a linear equalizer (LE) for use to equalize the received signal if the quality metric is worse than the threshold value,
    if the LE is selected for use, deriving initial values for coefficients of the LE based on coefficients of a feed-forward filter and a feedback filter for the DFE; and
    if the LE is selected for use, adapting the coefficients of the LE for an additional time period prior to using the LE to equalize the received signal.

2. The method of claim 1, further comprising:
    if the DFE is selected for use, adapting coefficients of the DFE for an additional time period prior to using the DFE to equalize the received signal.

3. The method of claim 1, wherein the quality metric relates to a mean square error (MSE) between equalized symbols from the DFE and expected symbols for the equalized symbols.

4. The method of claim 1, wherein the quality metric relates to a signal-to-noise-and-interference ratio (SINR).

5. The method of claim 1, wherein the quality metric relates to an error rate of detected symbols provided by a slicer to the DFE.

6. A method for equalizing a received signal in a wireless communication system, comprising:
    adapting a decision feedback equalizer (DFE) based on the received signal for an initial time period;
    determining a quality metric based on a signal-to-interference-and-noise ratio (SINR) for an output of the DFE after the initial time period;
    selecting periodically either the DFE or a linear equalizer (LE) for use to equalize the received signal based on the quality metric; and
    if the LE is selected for use,
        deriving initial values for coefficients of the LE based on coefficients of a feed-forward filter and a feedback filter for the DFE, and
        adapting the coefficients of the LE for an additional time period prior to using the LE to equalize the received signal.

7. An adaptive equalizer suitable for use in a wireless communication system, comprising:
    a filter unit configurable to implement either a decision feedback (DFE) or a linear equalizer (LE), wherein the DFE or the LE is selected periodically for use to equalize a received signal depending on a quality metric based on a signal-to-interference-and-noise ratio (SINR) and determined for an output of the DFE;

an adaptation unit operative to derive coefficients for the DFE or the LE depending on whether the DFE or LE is selected for use;

wherein the filter unit is initially configured to implement the DFE;

wherein the DFE is adapted based on the received signal for an initial time period and the quality metric is determined after the initial time period; and wherein if the LE is selected for use, the adaptation unit is further operative to derive initial values for coefficients of the LE based on coefficients of a feed-forward filter and a feedback filter for the DFE.

8. The adaptive equalizer of claim 7, wherein only a subset of the feedback filter coefficients is used to derive the initial coefficient values for the LE.

9. The adaptive equalizer of claim 7, wherein the adaptation unit is further operative to adapt the coefficients of the LE for an additional time period prior to using the LE to equalize the received signal.

10. The adaptive equalizer of claim 7, wherein the DFE is implemented with a feed-forward filter and a feedback filter, and wherein the LE is implemented with the feed-forward filter and by disabling the feedback filter.

11. The adaptive equalizer of claim 10, wherein the LE is implemented with the feed-forward filter having an extended length.

12. The adaptive equalizer of claim 10, wherein the feed-forward filter and the feedback filter are each implemented with a finite impulse response (FIR) filter.

13. The adaptive equalizer of claim 7, wherein the adaptation unit is operative to derive the coefficients for the DFE or the LE based on a particular adaptive algorithm.

14. The adaptive equalizer of claim 13, wherein the adaptive algorithm is a least mean square (LMS) algorithm.

15. The adaptive equalizer of claim 7, wherein the adaptation unit is operative to adapt the coefficients for the DFE or the LE based on expected symbols.

16. The adaptive equalizer of claim 15, wherein the expected symbols are pilot symbols.

17. The adaptive equalizer of claim 15, wherein the expected symbols are detected symbols provided by a slicer based on a particular signal constellation.

18. An adaptive equalizer suitable for use in a wireless communication system, comprising:

a filter unit configurable to implement either a decision feedback equalizer (DFE) or a linear equalizer (LE), wherein the DFE or the LE is selected for use to equalize a received signal depending on a quality metric based on a signal-to-interference-and-noise ratio (SINR) and determined for an output of the DFE; and an adaptation unit operative to determine the quality metric for the DFE output, derive coefficients for the DFE or the LE depending on whether the DFE or LE is selected periodically for use, and if the LE is selected for use, derive initial values for coefficients of the LE based on coefficients of a feed-forward filter and a feedback filter for the DFE, and adapt the coefficients of the LE for an additional time period prior to using the LE to equalize the received signal.

19. A memory communicatively coupled to a digital signal processing device (DSPD) capable of interpreting digital information to:

adapt a decision feedback equalizer (DFE) based on a received signal for an initial time period;

determine a quality metric based on a signal-to-interference-and-noise ratio (SINR) for an output of the DFE;

select periodically the DFE for use to equalize the received signal if the quality metric is better than a threshold value;

select periodically a linear equalizer (LE) for use to equalize the received signal if the quality metric is worse than the threshold value;

wherein the quality metric is determined after the initial time period; and wherein if the LE is selected for use, an adaptation unit is further operative to derive initial values for coefficients of the LE based on coefficients of a feed-forward filter and a feedback filter for the DFE.

20. A computer program product for equalizing a received signal in a wireless communication system, comprising:

code for adapting a decision feedback equalizer (DFE) based on a received signal for an initial time period;

code for determining a quality metric based on a signal-to-interference-and-noise ratio (SINR) for an output of the DFE;

code for selecting periodically the DFE for use to equalize the received signal if the quality metric is better than a threshold value;

code for selecting periodically a linear equalizer (LE) for use to equalize the received signal if the quality metric is worse than the threshold value wherein the quality metric is determined after the initial time period; and code wherein if the LE is selected for use, an adaptation unit is further operative to derive initial values for coefficients of the LE based on coefficients of a feed-forward filter and a feedback filter for the DFE a computer-usable medium for storing the codes.

21. An integrated circuit, comprising:

a filter unit configurable to implement either a decision feedback equalizer (DFE) or a linear equalizer (LE), wherein the DFE or the LE is selected periodically for use to equalize a received signal depending on a quality metric based on a signal-to-interference-and-noise ratio (SINR) and determined for an output of the DFE;

an adaptation unit operative to derive coefficients for the DFE or the LE depending on whether the DFE or LE is selected for use;

wherein the filter unit is initially configured to implement the DFE;

wherein the DFE is adapted based on the received signal for an initial time period and the quality metric is determined after the initial time period; and wherein if the LE is selected for use, the adaptation unit is further operative to derive values for coefficients of the LE based on coefficients of a feed-forward filter and a feedback filter for the DFE.

22. A receiver system in a wireless communication system, comprising:

a receiver unit operative to process a received signal to provide data samples; and a data processor operative to process the data sample to provide equalized symbols, the data processor including a filter unit configurable to implement either a decision feedback equalizer (DFE) or a linear equalizer (LE), wherein the DFE or the LE is selected periodically for use to equalize a received signal depending on a quality metric based on a signal-to-interference-and-noise ratio (SINR) and determined for an output of the DFE;

an adaptation unit operative to derive coefficients for th DFE or the LE depending on whether the DFE or LE is selected for use;

wherein the filter unit is initially configured to implement the DFE;

wherein the DFE is adapted based on the received signal for an initial time period and the quality metric is determined after the initial time period; and wherein if the LE is selected for use, the adaptation unit is further operative to derive initial values for coefficients of the LE based on coefficients of a feed-forward filter and a feedback filter for the DFE.

23. An apparatus in a wireless communication system, comprising:

means for implementing a decision feedback equalizer (DFE) or a linear equalizer (LE) based on a quality metric wherein said quality metric is based on a signal-to-interference-and-noise ratio (SINR);

means for adapting the DFE based on a received signal for an initial time period;

means for determining said quality metric for an output of the DFE;

means for selecting periodically either the DFE or the LE for use to equalize the received signal based on the quality metric;

means for deriving initial values for coefficients of the LE based on coefficients of a feed-forward filter and a feedback filter for the DFE, if the LE is selected for use; and means for adapting the coefficients of the LE for an additional time period prior to using the LE to equalize the received signal, if the LE is selected for use.

* * * * *